US008447602B2

(12) United States Patent
Bartosik et al.

(10) Patent No.: US 8,447,602 B2
(45) Date of Patent: May 21, 2013

(54) SYSTEM FOR SPEECH RECOGNITION AND CORRECTION, CORRECTION DEVICE AND METHOD FOR CREATING A LEXICON OF ALTERNATIVES

(75) Inventors: Heinrich Franz Bartosik, Vienna (AT); Carsten Meyer, Aachen (DE)

(73) Assignee: Nuance Communications Austria GmbH, Vienna (AT)

( * ) Notice: Subject to any disclaimer, the term of this patent is extended or adjusted under 35 U.S.C. 154(b) by 651 days.

(21) Appl. No.: 10/550,967

(22) PCT Filed: Mar. 22, 2004

(86) PCT No.: PCT/IB2004/050297
§ 371 (c)(1), (2), (4) Date: Sep. 26, 2005

(87) PCT Pub. No.: WO2004/086359
PCT Pub. Date: Oct. 7, 2004

(65) Prior Publication Data
US 2007/0033026 A1   Feb. 8, 2007

(30) Foreign Application Priority Data

Mar. 26, 2003   (EP) .................................. 03100782

(51) Int. Cl.
G10L 15/26 (2006.01)
G10L 15/00 (2006.01)
G06F 17/21 (2006.01)

(52) U.S. Cl.
USPC .............................. 704/235; 704/231; 704/10

(58) Field of Classification Search
USPC .................... 704/10, 257, E15.018, E15.044, 704/235, 231
See application file for complete search history.

(56) References Cited

U.S. PATENT DOCUMENTS 5,031,113 A   7/1991 Hollerbauer
5,794,189 A * 8/1998 Gould .......................... 704/231

(Continued)

FOREIGN PATENT DOCUMENTS

EP   0836144 A2   4/1998
JP   07-168915    7/1995

(Continued)

OTHER PUBLICATIONS

Office Action dated Mar. 23, 2010 in Japanese Patent Application No. 2006-506741.

(Continued)

Primary Examiner — Jesse Pullias
(74) Attorney, Agent, or Firm — Wolf, Greenfield & Sacks, P.C.

(57) ABSTRACT

In a speech recognition and correction system which comprises at least one speech recognition device (1) to which a spoken text (GT) can be fed, it being possible for said spoken text to be transcribe into a recognized text (ET), and a correction device (3) for correcting the text (ET) recognized by the at least one speech recognition device (1), said correction device being connected to the at least one speech recognition device (1) via a data network (2) for the transmission of the recognized text (ET) and where appropriate of the spoken text (GT), the correction device (3) has a lexicon of alternatives (23) which contains word parts, words and word sequences that can be displayed (22) by the correction device (3) as alternatives to individual word parts, words and word sequences of the recognized text.

24 Claims, 1 Drawing Sheet

U.S. PATENT DOCUMENTS

| | | | |
|---|---|---|---|
| 5,799,273 A * | 8/1998 | Mitchell et al. | 704/235 |
| 5,864,805 A * | 1/1999 | Chen et al. | 704/235 |
| 5,950,160 A * | 9/1999 | Rozak | 704/252 |
| 5,960,447 A * | 9/1999 | Holt et al. | 715/201 |
| 6,278,968 B1 * | 8/2001 | Franz et al. | 704/3 |
| 6,314,397 B1 * | 11/2001 | Lewis et al. | 704/235 |
| 6,332,122 B1 * | 12/2001 | Ortega et al. | 704/270 |
| 6,374,214 B1 * | 4/2002 | Friedland et al. | 704/235 |
| 6,418,410 B1 * | 7/2002 | Nassiff et al. | 704/251 |
| 6,507,816 B2 * | 1/2003 | Ortega | 704/235 |
| 6,618,697 B1 * | 9/2003 | Kantrowitz et al. | 703/22 |
| 6,738,741 B2 * | 5/2004 | Emam et al. | 704/251 |
| 6,859,774 B2 * | 2/2005 | Mangu et al. | 704/255 |
| 6,963,841 B2 * | 11/2005 | Handal et al. | 704/270 |
| 2002/0002459 A1 | 1/2002 | Lewis et al. | |

FOREIGN PATENT DOCUMENTS

| | | |
|---|---|---|
| JP | 10-078964 | 3/1998 |
| JP | 2000-089786 | 3/2000 |
| WO | 0131634 A1 | 5/2001 |
| WO | WO 01/31634 A1 * | 5/2001 |

OTHER PUBLICATIONS

Office Action dated Sep. 6, 2010 in Japanese Patent Application No. 2006-506741.

Written Opinion of the International Searching Authority PCT/IB2004/050297, Dated Nov. 18, 2004.

* cited by examiner

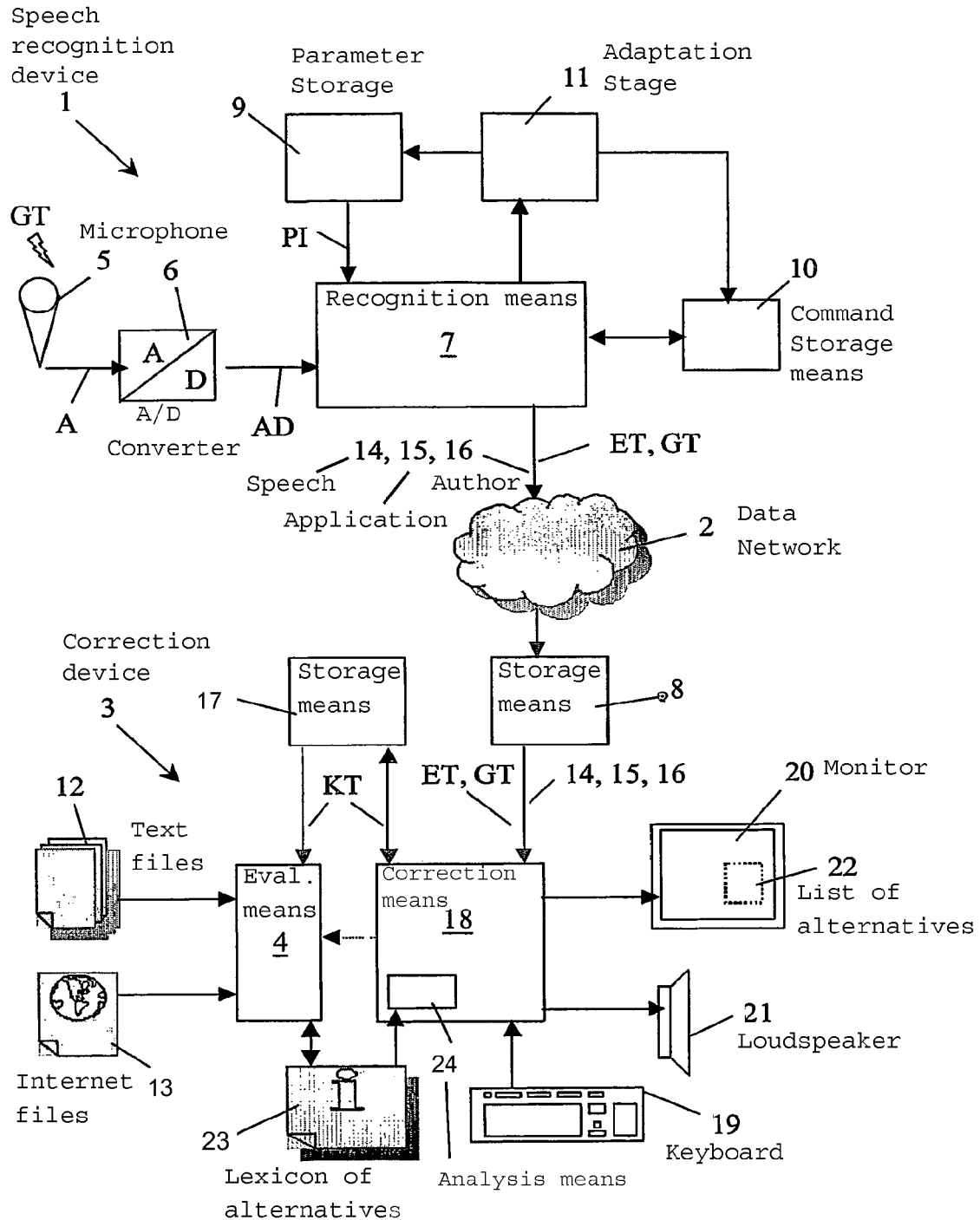

SYSTEM FOR SPEECH RECOGNITION AND CORRECTION, CORRECTION DEVICE AND METHOD FOR CREATING A LEXICON OF ALTERNATIVES

The invention relates to a speech recognition and correction system which comprises at least one speech recognition device to which a spoken text can be fed, it being possible for said spoken text to be transcribed into a recognized text, and a correction device for correcting the text recognized by the at least one speech recognition device, said correction device being connected to the at least one speech recognition device via a data network for the transmission of the recognized text and where appropriate of the spoken text.

The invention furthermore relates to a correction device for correcting a text recognized by a speech recognition device.

The invention furthermore relates to a method of creating a lexicon of alternatives for determining data record entries for a lexicon of alternatives for the correction of recognized text which has been transcribed from spoken text by a speech recognition device.

Such a speech recognition and correction system is known from the document U.S. Pat. No. 5,864,805. That document discloses a speech recognition system which operates continuously and is able to recognize and correct errors within words and word sequences. To correct errors, data are stored in the internal memory of the speech recognition system in order thus to update probability tables recorded in the speech recognition system, said probability tables being used in the development of lists of alternatives to replace incorrectly recognized text.

In the known speech recognition and correction system, it has proven to be a disadvantage that it can be used only as a stand-alone solution, that is to say that this speech recognition and correction system is restricted to an individual computer in which all the data required by the speech recognition and correction system are stored. However, modern speech recognition systems are often designed as distributed systems in which a large number of computers with speech recognition software or parts thereof running thereon are connected to one another via a data network. In these advanced systems there is often also a distribution of the tasks of the speech recognition and correction system over a number of computers. As an example of this, there may be mentioned a speech recognition system as used in clinical diagnosis in hospitals. In that case, diagnoses are dictated into the speech recognition system by a large number of doctors in different examination rooms, and these diagnoses are converted into a recognized text by the speech recognition system and stored centrally together with an audio recording of the spoken text. However, the recognized text is still a rough version which has to be cleared of any recognition errors in a correction process. This correction is usually carried out by a secretary, it being customary for a single secretary to correct the dictations of a large number of doctors. Since in this speech recognition system both the doctors in the individual examination rooms and the secretary in an office are remote from one another and also usually work at different times, the solution proposed in the document U.S. Pat. No. 5,864,805 cannot be used for a distributed speech recognition system. On the other hand, it is also not practical for the information which is obtained in the transcription process of the speech recognition system and which could be used to compile lists of alternatives for the correction to be transmitted via a data network to that computer on which the recognized text is to be corrected, since the amounts of data that are obtained are much too large. Thus, the probability tables mentioned in the document U.S. Pat. No. 5,864,805 would increase in size much too quickly to be transmitted in continuously updated form to a correction device via a data network, particularly if the data network used is a data network having a small bandwidth. It is in practice also not possible for the information obtained during the transcription process of the speech recognition system to be transmitted directly to a correction device and for the information to be analyzed there since in this case, too, the network bandwidths required would be much too large, especially for networks having a small bandwidth. Specifically, it is to be considered that modern speech recognition systems typically process in parallel 5000 to 8000 probability hypotheses as to how a spoken text could be converted into a recognized text. However, information from these probability hypotheses would be necessary for the correction device. If, for example, there is a recognition result, i.e. the best hypothesis out of 1000 words, and each word occurs ten times in the original word graph, in the extreme case it would be necessary to transmit variants that consist of 1000 to the power of 10 words and differ only in respect of a different time distribution.

On the other hand, although developers of speech recognition systems are working hard to improve their systems, a 100% recognition rate cannot be expected in the foreseeable future, which means that corrections to the recognized text will still be necessary. There is therefore a need to make this correction easier by offering the person carrying out the correction alternatives to the incorrectly recognized words during the correction operation so that they can quickly select one of the alternatives offered.

It is therefore an object of the invention to provide a speech recognition and correction system of the type specified in the first paragraph, a correction device of the type specified in the second paragraph and a method of creating a lexicon of alternatives of the type specified in the third paragraph, wherein the abovementioned disadvantages are avoided. To achieve the object mentioned above, in such a speech recognition and correction system it is provided that the correction device has a lexicon of alternatives which contains word parts, words and word sequences that can be displayed by the correction device as alternatives to individual word parts, words and word sequences of the recognized text.

To achieve the object mentioned above, in such a correction device it is provided that a lexicon of alternatives is stored in the correction device, which lexicon of alternatives contains word parts, words and word sequences that can be displayed by the correction device as alternatives to individual word parts, words and word sequences of the recognized text.

The term "lexicon of alternatives" is to be understood as meaning that it is based on information that is independent of the transcription process of speech recognition devices. In particular, the lexicon of alternatives is not based on alternative recognition hypotheses that have been created by speech recognition devices during the transcription process and deemed to be worse, in terms of the probability of it being correct, than the recognition hypothesis reflected in the recognized text.

To achieve the object mentioned above, in such a method of creating a lexicon of alternatives it is provided that sources of knowledge that are independent of the speech recognition device, in particular text files specific to the field of application, such as medical or legal texts, or confusion statistics compiled from a large number of corrected texts and associated recognized texts (ET) generated by speech recognition devices, are examined with respect to text elements such as word parts, words or word sequences that can be confused with one another, and such text elements that can be confused with one another are put together as alternatives in a data record entry.

By virtue of the features according to the invention, the correction of texts recognized by a speech recognition system can be carried out in a more simple and rapid manner than has been possible to date, it being possible for the invention to be used in a particularly advantageous manner in speech recognition systems in which recognition and correction are not carried out on the same computer. The giving of alternatives brought about by the invention is moreover extremely efficient, flexible and robust, that is to say independent of specific recognition errors. Besides the omission of an extensive transfer of data between speech recognition system and correction device during the correction operation, the invention also offers the further significant advantage that the proposals of alternatives from the lexicon of alternatives are independent of the respective recognition capability of the speech recognition device. By contrast, systems known to date had the disadvantage that, in the event of the speech recognition device having a low recognition rate, in many cases no usable alternatives were offered during the correction operation since these alternatives were also incorrect.

The measures of claim 2 provide the advantage that the correction device can be operated independently of the information obtained during the transcription process in the speech recognition system, so that apart from the transmission of the recognized text and where appropriate of the original spoken text no data communication between the speech recognition system and the correction device is necessary. By virtue of the high degree of flexibility of the solution according to the invention, easy adaptation to new contexts or styles of speech is also possible. In a preferred embodiment, the correction device may be based on analysis means for analyzing selected text passages of the recognized text, which analysis means determine alternatives to the selected text passages from the lexicon of alternatives preferably by means of character chain comparison or higher-level syntactic analysis methods. Syntactic analysis methods comprise, for example, the detection of syntactic constituents, such as noun/verb pairs, nominal phrases, etc.

The measures of claim 4 provide the advantage that the user can be shown alternatives to the passages of the recognized text that have already been processed, for example via defined hotkeys on the keyboard of the correction device.

The measures of claim 5 in turn provide the advantage that the correction device can continually offer alternatives to selected text passages by way of analysis means that are continually running in the background.

The measures of claim 7 provide the advantage that the lexicon of alternatives can be compiled and updated both offline and online independently of a speech recognition system, since the sources of information used are independent of that information which is usually or continually available during the transcription process of a speech recognition system.

The measures of claim 8 provide the advantage that the knowledge for determining data record entries often comes from knowing or seeing which confusions are made particularly frequently by a speech recognition system. By way of example, homophonic words, that is to say words that sound the same but are written differently, are of course confused particularly frequently by the speech recognition system. By using the correction information to compile a lexicon of alternatives, the capability of a speech recognition system can additionally be improved without it being necessary to train the speech recognition system again in respect of the errors made. In other words, the correction system learns from the errors made by the speech recognition system.

In order to increase the robustness of the method of creating data record entries in a lexicon of alternatives, it is advantageously possible to make use of statistical methods as mentioned in claims 8 to 10. By virtue of these statistical methods, the list of alternatives for a word element that is to be replaced does not contain too many entries, and hence does not become unwieldy for the user, in that only those alternatives which occur sufficiently frequently in the correction are recorded. On the other hand, introducing an upper limit value for the frequency of a replacement during the correction operation ensures that systematic replacements which are (almost) always corrected by the same word element, such as the replacement of the instruction "end of letter" in a dictation by "Regards, Mr. Meyer" for example, are not offered as the only alternative. Such a case should be regulated by other mechanisms.

The measures of claim 11 provide the advantage that it is recognized whether the matter in question is a replacement "that is to be taken seriously", for instance the replacements "mein-dein", "dem-den", etc. in the case of the German language. The necessary phonetic similarity can be determined either via the spoken text which in this case is transmitted to the correction device or from the phonetics of the words in question, which are known to the correction device.

The measures of claim 12 provide the advantage that there are recorded in the list of alternatives only those words which occur in time terms at approximately the same point in the spoken text. If, for example, some words or sections of text which have nothing to do with the spoken text are added systematically by the user during the correction operation or words which then do not appear in the corrected text are systematically left out, it is not expedient to deal with such corrections using lists of alternatives.

Data record entries in a lexicon of alternatives may have varying degrees of detail. Thus, different lists of alternatives may be compiled depending on the speech used in the spoken text. Furthermore, the data record entries of the lexicon of alternatives may be subdivided according to technical field or field of application or be subdivided according to the author of the original spoken or corrected text. Combinations of the abovementioned degrees of detail are also possible.

The measures of claim 17 provide the advantage that the lexicon of alternatives is continually improved during the correction of recognized text and thus trains itself.

The invention will be further described with reference to an example of embodiment shown in the drawing to which, however, the invention is not restricted.

FIG. 1 shows a speech recognition system having a correction system that is connected thereto via a data network.

FIG. 1 shows a speech recognition device 1 for transcribing a spoken text GT. The speech recognition device 1 may be formed by a computer which runs a speech recognition software application. The speech recognition device 1 comprises speech recognition means 7, parameter storage means 9, command storage means 10 and an adaptation stage 11. An audio signal A representing a spoken text GT can be transmitted via a microphone 5 to an A/D converter 6 which converts the audio signal A into digital audio data AD that can be fed to the speech recognition means 7. The digital audio data AD are converted by the speech recognition means 7 into recognized text ET which is stored in storage means 8 via a data network 2. For this purpose, parameter information PI, which contains vocabulary (context) information, speech model information and acoustic information and is stored in the parameter storage means 9, is taken into account.

The context information includes all words that can be recognized by the speech recognition means 7 together with the associated phoneme sequences. The context information is obtained by analyzing a large number of texts relevant to the envisaged application. By way of example, for a speech recognition system used in the field of radiology, findings comprising a total number of 50 to 100 million words are analyzed. The speech model information includes statistical information about sequences of words that are customary in the speech of the spoken text GT, in particular the probabilities of the occurrence of words and their connection to words coming before and after. The acoustic information includes information about the types of speech specific to a user of the speech recognition device 1 and about acoustic properties of the microphone 5 and of the A/D converter 6.

The document U.S. Pat. No. 5,031,113, the disclosure of which is hereby incorporated by reference into the disclosure of the present document, discloses the implementation of a speech recognition method taking account of such parameter information PI, and hence no further details of this are given in the present text. Following the speech recognition method, the speech recognition means 7 can store text data containing the recognized text ET in the storage means 8. Furthermore, the spoken text GT can be stored in the storage means 8 in digitized form. In addition, information about the speech used 14, the application 15 and the author 16 can be transmitted by the speech recognition system 1 via the data network 2 together with the recognized text ET and stored in the storage means 8.

In the command storage stage 10, sequences of words are stored which are recognized as a command by the speech recognition means 7. Such commands include, for example, the sequence of words "next word bold" to make the next word in the recognized text ET bold.

A correction device 3 has access to the recognized text ET stored in the storage means 8 in order to read it together with the acoustic information about the original spoken text GT and the information about the speech 14, the application (technical field) 15 and the author 16 so that the recognized text ET can be corrected by means of a text processing system. In particular, all the functions of the advanced speech recognition software application as mentioned below can be used on the recognized text ET. The correction device 3 comprises playback and correction means 18 to which there are connected a keyboard 19, a monitor 20 and a loudspeaker 21. The playback and correction means 18 are designed for the visual displaying of the recognized text ET on the monitor 20 and for the acoustic playback of the spoken text GT by way of the loudspeaker 21 and for the synchronous visual marking, in the recognized text ET, of the passages of the spoken text that are being acoustically played back, when the playback and correction means 18 are in the activated synchronous playback mode. In this playback mode, it is possible for the recognized text to be corrected simultaneously by means of keyboard inputs and where appropriate also by means of voice commands via a microphone (not shown). The corrected text KT can be stored in storage means 17.

The playback and correction means 18 comprise analysis means 24 for analyzing text passages of the recognized text ET that have been selected, in order to propose to the user of the correction device alternatives to the selected text passages from a lexicon of alternatives 23 which is stored in the correction device 3. The alternatives are presented to the user in the form of a list of alternatives 22 on the monitor, and the user can navigate within this list by means of cursor keys on the keyboard 19 or by means of a mouse (not shown) or the like in order to select a replacement or carry out a correction manually. The analysis means 24 either operate continuously in the background or can be activated by the user of the correction device 3 by the user's pressing a key or combination of keys ("hotkey"). The analysis means analyze the selected text passages preferably either by means of character chain comparison or by a syntactic analysis method. The character chain comparison may be based on individual words or components of individual words or on phrases (which are to be detected). The comparison may furthermore be based on expressions made up of a number of syntactic constituents, such as noun/verb pairs, nominal phrases, etc. All these expressions are also referred to in general in the present patent application by the term "text element". The lists of alternatives proposed by the analysis means 24 may in turn comprise individual words or parts thereof or whole phrases. The following recognized text may be mentioned by way of an example of the replacement of individual words: "The epigastric vessels were seen interiorly, and he had history of edema." The words shown in italics were recognized incorrectly. If, during correction of this recognized text, the cursor is located over the word "interiorly", then a list of alternatives comprising one or more entries is offered by the analysis means for correction purposes, said list of alternatives including the word "anteriorly" which in this case would be the correct word. By simply selecting the word "anteriorly", the user can carry out the rapid replacement of "interiorly" by said word. The same applies in respect of the word "edema", which is to be replaced by the word "anemia" offered in a further list of alternatives. The user can thus correct the incorrectly recognized sentence by pressing just a few keys, to give: "The epigastric vessels were seen anteriorly, and he had history of anemia." In one example of the replacement of phrases, as an alternative to the recognized phrase "rhythm without lists" there may be offered the correct phrase "rhythm without lifts." It should be noted that in this case, although only one letter is changed in the recognized text during the replacement, the entire phrase cited is examined, offered as an alternative and replaced when selected by the user of the correction device. A further example relates to alternatives having a number of constituents. These constituents may be technical expressions, noun/verb pairs, etc. The analysis means 24 may in this case make use of an algorithm in which a tagging of the recognized text and the calculation of degrees of confidence for the individual words (elements) are first carried out. A noun/verb pair or a nominal phrase is then determined for nouns having a low degree of confidence. Thereafter, the identity of the associated list of alternatives is determined for the complementary element (verb or noun) by means of character chain comparison, whereupon the other elements are displayed in the form of a list of alternatives. By means of this method, for example, in the incorrectly recognized sentence: "The extraneous tendinous materials were all debrided." the correction of the word "materials" by "trails" can be offered in a list of alternatives in that the analysis means 24 discover the low degree of confidence of the word "materials", identify the noun/verb pair "material debrided" and by way of the verb "debrided" determines the relevant list of alternatives in which the entry "trails derided" appears. If this entry is selected by the user, then the noun and the verb are replaced, even if in the text only the replacement of "materials" by "trails" is visible to the user. As a further example in respect of the determination of alternatives having a number of constituents, there may be mentioned the incorrectly recognized phrase: "Discharge medications two CCU", which should actually have been recognized as "Disposition to CCU." The analysis means 24 detect the low degree of confidence of the word "medications" and identify the nominal phrase "Discharge medications." The determination of a relevant entry in the list of alternatives is carried out by way of the term "CCU" and reads "Disposition to CCU." This entry may be selected by the user and replaces the whole of the abovementioned incorrectly recognized phrase.

The analysis means 24 determine selected passages of the recognized text ET for example from the cursor position of a text processing program which is used to correct the recognized text or from the time position of the spoken text passage and its association with the recognized text. It is thus possible for the user of the correction device 3 to effectively and rapidly correct the recognized text by selecting alternative wordings.

The correction device 3 also comprises evaluation means 4 for creating the lexicon of alternatives 23 or individual entries thereof. It should be noted that evaluation means may also be provided independently of the correction device 3 in order to compile a basic lexicon of alternatives from various sources of knowledge that are independent of the speech recognition system 1, which basic lexicon of alternatives can then be stored for use purposes in the correction device 3. In the example of embodiment shown, the evaluation means 4 access, by way of the playback and correction means 18, the spoken and recognized texts GT, ET stored in the storage means 8, and also the information about the speech 14, the application 15 and the author 16, it also being possible in an alternative embodiment for the evaluation means 4 to have direct access to the storage means 8. The evaluation means 4 furthermore read the corrected text KT from the storage means 17 in order to compare it with the recognized text ET and thus determine the text element replacements carried out on the recognized text ET. These text element replacements are analyzed statistically and recorded as alternatives in data record entries of the lexicon of alternatives 23 if they meet specific conditions discussed in more detail below. Thus, in one preferred embodiment, the recognized text ET is compared with the corrected text KT and those replacements are determined which show the lowest overall deviation, that is to say the minimum number of errors, over the entire text. This information is used to compile the list of alternatives. In order to improve the robustness of the system, that is to say not to fill the list of alternatives with too many entries, it is useful to compile statistics showing how frequently a word element is replaced by another. The word element acting as replacement is recorded in the list of alternatives only if a predetermined lower limit value of the relative or absolute frequency is exceeded. It may also be useful to introduce an upper limit value for the frequency of replacement of a word element by another, the word element being recorded in a list of alternatives only if said upper limit value is not reached. If the upper limit value is exceeded, this indicates either a systematic error of the speech recognition system which cannot be corrected by means of lists of alternatives or the replacement of text parts which cannot be carried out on account of instances of incorrect recognition.

A further measure for improving the robustness with which a lexicon of alternatives is compiled relates to the analyzing of the phonetic similarity of the term being replaced and the term acting as replacement. It is thus possible to ensure that these pairs of terms have a sufficient degree of phonetic similarity, for example mein-dein, dem-den in the German language, to be regarded as instances of incorrect recognition by the speech recognition system which should be recorded in a list of alternatives.

Yet another measure for improving the robustness with which a lexicon of alternatives is compiled relates to the analyzing of the time position in which the corrected text elements lie. Accordingly, only those text elements which lie in time terms at approximately the same point in the spoken text are recorded in a list of alternatives. It is thus possible to prevent, for example, words which the user of the correction device has added into the recognized text or deleted therefrom for formatting or content reasons, but which have nothing to do with the correction of instances of incorrect recognition, from being entered in lists of alternatives.

Furthermore, the data records in the lexicon of alternatives may additionally be subdivided according to the speech used, application (technical field) or author, or a combination of these. As soon as a recognized text ET is passed for correction about which information is additionally known regarding the speech 14, application (technical field) 15 and author 16, the appropriate list of alternatives is loaded from the lexicon of alternatives 23 and is available for the rapid calling-up of alternatives.

In the embodiment shown, the evaluation means 4 operate continuously in the background, so that the lexicon of alternatives 23 is improved and hence trained, as it were, online.

Besides evaluating the corrected text KT for the purpose of creating the lexicon of alternatives 23, the evaluation means 4 may in addition or as an alternative make use for this purpose of other sources of knowledge that are independent of the speech recognition system 1, in particular text files 12, for instance clinical findings, and also where appropriate confusion statistics which are analyzed to compile data record entries in the lexicon of alternatives 23. These files may on the one hand be stored on the hard disk of a computer on which the analysis means 4 are run; on the other hand, such files may also be accessed via a data network. Advantageously, the Internet can also be searched to analyze suitable Internet files 13, this process being particularly well suited to automation—as is the entire method for determining data record entries in the lexicon of alternatives.

The invention claimed is:

1. A speech recognition and correction system comprising:
at least one speech recognition device configured to transcribe a spoken text into a recognized text; and
a correction device configured to:
correct the recognized text, said correction device being connected to the at least one speech recognition device via a data communications medium for the transmission of the recognized text and/or of the spoken text;
access a lexicon of alternatives, the lexicon of alternatives comprising a plurality of entries, wherein the plurality of entries include one or more alternatives determined from one or more sources of knowledge that are independent of an analysis by an acoustic model and a language model used by the at least one speech recognition device during transcription of the spoken text, wherein the one or more sources of knowledge include confusion information compiled from corrected texts and associated recognized texts; and
display at least some of the plurality of entries as a list of alternatives to individual word parts, words and/or word sequences of the recognized text.

2. A speech recognition and correction system as claimed in claim 1, wherein the correction device is further configured to:
update the list of alternatives for at least some of the plurality of entries in the lexicon of alternatives displayed for a particular individual word part, word, and/or word sequence based, at least in part, on a number of times that the correction device previously corrected the particular individual word part, word, and/or word sequence with a text element replacement selected by a user, wherein the list of alternatives is updated only when the number of times is at least two times.

3. A correction device for correcting a text recognized by a speech recognition device, the correction device comprising:
a storage device configured to store a lexicon of alternatives comprising a plurality of entries, wherein the plurality of entries include one or more alternatives determined from one or more sources of knowledge that are independent of an analysis by an acoustic model and a language model used by the speech recognition device, wherein the one or more sources of knowledge include confusion information compiled from corrected texts and associated recognized texts; and
at least one processor configured to:
display at least some of the plurality of entries as a list of alternatives to individual word parts, words and/or word sequences of the recognized text.

4. A correction device as claimed in claim 3, further comprising:
an analyzer configured to analyze selected text passages of the recognized text by using character chain comparison or syntactic analysis, and to determine alternatives to the selected text passages from the lexicon of alternatives.

5. A correction device as claimed in claim 4, wherein the analyzer can be activated by a user of the correction device.

6. A correction device as claimed in claim 4, wherein the analyzer determines selected text passages from a cursor position or a marking information of a text processing program.

7. A correction device as claimed in claim 4, wherein the analyzer determines selected text passages from a time position of the spoken text and its association with the recognized text.

8. A correction device as claimed in claim 3, wherein the at least one processor is further configured to:
update the list of alternatives for at least some of the plurality of entries in the lexicon of alternatives displayed for a particular individual word part, word, and/or word sequence based, at least in part, on information about at least one previous correction made by the correction device for the particular individual word part, word, and/or word sequence with a text element replacement selected by a user, wherein the list of alternatives is updated only when at least a predetermined degree of phonetic similarity exists between the particular individual word part, word, and/or word sequence and a text replacement in the at least one previous correction.

9. The correction device of claim 3, wherein the one or more alternatives are further determined based, at least in part, on confusion information for a particular speaker of the associated recognized texts.

10. The correction device of claim 3, wherein the one or more alternatives are further determined based, at least in part, on syntactic information.

11. The correction device of claim 3, wherein the one or more alternatives are further determined based, at least in part, on phonetic sequence information.

12. The correction device of claim 3, wherein the confusion information comprises confusion statistics.

13. A computer-implemented method of creating an entry in a lexicon of alternatives used to correct recognized text transcribed from a spoken text by a speech recognition device, the method comprising:
examining, by at least one processor, at least one source of knowledge that is independent of an acoustic model and a language model used by the speech recognition device, wherein the at least one source of knowledge includes confusion information compiled from corrected texts and associated recognized texts, wherein the at least one source of knowledge is examined with respect to text elements, including word parts, words and/or word sequences associated with the confusion information contained therein to identify text elements that can be confused with one another; and
including the text elements that can be confused with one another as a list of alternatives in the entry of the lexicon of alternatives.

14. A computer-implemented method as claimed in claim 13, further comprising:
determining the text element replacements made in a corrected text with respect to the recognized text transcribed by the speech recognition device; and
recording the text element replacements as alternatives in the lexicon of alternatives.

15. A computer-implemented method as claimed in claim 14, further comprising:
evaluating a frequency of each text element replacement, and
recording the text element replacements as alternatives in the lexicon of alternatives only when a predetermined lower limit value of the frequency, expressed by an absolute number of the text element replacements or the ratio of number of the text element replacements with respect to the overall number of text elements examined or with respect to an overall occurrence of a given text element is exceeded.

16. A computer-implemented method as claimed in claim 15, further comprising:
evaluating a frequency of each text element examined in the at least one source of knowledge; and
recording the text element replacements as alternatives in the lexicon of alternatives only when a predetermined upper limit value of the frequency, expressed by an absolute number of the text element replacements or a ratio of a number of the text element replacements with respect to an overall number of text elements examined, is not reached.

17. A computer-implemented method as claimed in claim 14, further comprising:
analyzing the acoustic similarity of the text element replacements; and
recording the text element replacements as alternatives in the lexicon of alternatives only when the text element replacements have a predetermined degree of phonetic similarity.

18. A computer-implemented method as claimed in claim 14, further comprising:
analyzing time positions of the text element replacements with respect to the spoken text; and
recording the text element replacements as alternatives in the lexicon of alternatives only when there is a corresponding text element in the spoken text that is similar in terms of time.

19. A computer-implemented method as claimed in claim 13, wherein the lexicon of alternatives comprises a plurality of entries, the method further comprising:
subdividing the plurality of entries according to speech.

20. A computer-implemented method as claimed in claim 13, wherein the lexicon of alternatives comprises a plurality of entries, the method further comprising:
subdividing the plurality of entries according to technical field or field of application.

21. A computer-implemented method as claimed in claim 13, wherein the lexicon of alternatives comprises a plurality of entries, the method further comprising:
  subdividing the plurality of entries according to author of the spoken text or a corrected text.

22. A computer-implemented method as claimed in claim 13, wherein the lexicon of alternatives is adapted online during a correction of recognized texts.

23. A computer-implemented method as claimed in claim 13, wherein the at least one source of knowledge that is independent of an acoustic model and a language model used by the speech recognition device includes text files specific to a field of application.

24. A computer-implemented method as claimed in claim 13, further comprising:
  updating the list of alternatives in the entry based, at least in part, on whether a frequency of previous corrections of the recognized text with text element replacements selected by a user is within predetermined bounds.

* * * * *